United States Patent
Lagos et al.

(10) Patent No.: US 6,171,626 B1
(45) Date of Patent: *Jan. 9, 2001

(54) PROCEDURE FOR DETOXIFICATION OF SHELLFISH, CONTAMINATED WITH PARALYTIC SHELLFISH TOXINS

(75) Inventors: Nestor Lagos; Max Rutman; Jenny Blamey; Maria Paz Ocaranza; Mario Chiong; Juan Pablo Hinrichsen; Claudia Lopez, all of Santiago (CL)

(73) Assignee: Tepual S.A., Santiago (CL)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/890,594

(22) Filed: Jul. 9, 1997

(30) Foreign Application Priority Data

Aug. 29, 1996 (CL) ...................................... 1525-96

(51) Int. Cl.[7] ................ A21D 4/00; A23L 1/325
(52) U.S. Cl. .................... 426/324; 426/323; 426/643
(58) Field of Search .................. 426/323, 324, 426/643

Primary Examiner—Anthony J. Weier
(74) Attorney, Agent, or Firm—Lackenbach Siegel Marzullo Aronson & Greenspan, P.C.

(57) ABSTRACT

This invention relates to a process for detoxifying shellfish contaminated with paralytic toxin. Actually no industrial method has been described that is 100% effective for detoxification of shellfish containing this type of toxins. Decontamination is achieved through a process involving the chemical treatment of shellfish. This chemical treatment consists of preincubating and then cooking the shellfish in an alkaline pH solution. This treatment can be combined with one or more other procedures for the reduction of the products' final toxicity, these other procedures including, for example, partial shellfish detoxification by depuration, removal of the most toxic parts, and commercial cooking/canning of the shellfish. The process reduces total toxicity levels in shellfish to values below 80 $\mu$g of eq. STX/100 g shellfish, independently of the toxin profile, or the initial toxicity present in the shellfish. This is the first known industrial process that guarantee the shellfish decontamination 100% compatible with the international regulatory norms for human consumption.

23 Claims, 5 Drawing Sheets

| R1 | R2 | R3 | Carbamoyl Toxins | N-Sulfocarbamoyl Toxins | Decarbamoyl Toxins |
|----|----|----|------------------|-------------------------|---------------------|
| H  | H  | H  | STX  | B1 | dc-STX  |
| OH | H  | H  | NEO  | B2 | dc-NEO  |
| OH | H  | OSO3- | GTX1 | C3 | dc-GTX1 |
| H  | H  | OSO3- | GTX2 | C1 | dc-GTX2 |
| H  | OSO3- | H | GTX3 | C2 | dc-GTX3 |
| OH | OSO3- | H | GTX4 | C4 | dc-GTX4 |

SCALLOP

CLAM

Figure 3 (A)

% molar

GTX (1-4)　NeoSTX　dcSTX　STX
Toxin

Figure 3 (B)

% molar

GTX(1-4)　NeoSTX　dcSTX　STX
Toxin

Figure 3 (C)

% molar

GTX(1-4)　NeoSTX　dcSTX　STX
Toxin

PROCEDURE FOR DETOXIFICATION OF SHELLFISH, CONTAMINATED WITH PARALYTIC SHELLFISH TOXINS

BACKGROUND OF THE INVENTION

Paralytic Shellfish Poisoning (PSP) has been known for centuries and it has been responsible for many deaths (Kao, 1966). The toxins responsible of PSP are tetrahydropurines that block sodium channels, resulting in respiratory and heart paralysis (Hall, 1982). At least 18 types of PSP toxins have been described (FIG. 1), mainly from marine dinoflagellates and shellfish that feed on toxic algae. Attempts to isolate PSP toxins began more than one century ago (Salkowski, 1885), but their occurrence as mixtures of compounds with diverse ionizable residues complicated their purification. The development of ionic exchange chromatography, guided by mouse bioassay, eventually allowed the isolation of a basic toxin, water soluble, from Alaska clams (*Saxidomas giganteus*) (Schantz et al., 1957). This compound was named saxitoxin (STX) and therefore the group of paralytic toxins, saxitoxins (Schuett and Rapoport, 1962). The STX structure is shown in FIG. 1 and was established by X ray crystalography (Schantz et al., 1975) and chemical synthesis (Tan et al., 1977; Kishi, 1980; Jacobi et al., 1984; Martinelli et al., 1986).

In most cases, PSP toxins correspond to sulphatated derivatives of STX, such as the 11-hydroxysaxitoxin sulphates (gonyautoxins GTX2 and GTX3) or N-sulphocarbamoyl derivatives (B1, C1 and C2). It is possible to find also the N-1-hydroxysaxitoxin or neosaxitoxin (NEO) and their sulphates (B2, GTX1, GTX4, C3 and C4), as well as the less common decarbamoyl toxins (FIG. 1) (Sullivan et al., 1983). The STXs potencies, measured by mouse bioassay, vary enormously. Generally, the carbamoyl toxins are the most potent, the sulphocarbamoyl toxins are the less potent, and the decarbamoyl toxins have intermediate potency (Oshima et al., 1992).

Shellfish acquire and concentrate the STXs as a result of feeding with toxic dinoflagellates. Several species of dinoflagellates have been associated with paralytic toxins, including *Alexandrium catenella* (Schantz et al., 1966; Proktor et al., 1975; Bates et al., 1978), *A. excavatum* (Desbiens et al., 1990), *A. fundyense* (Anderson et al., 1990) and *A. tamarensis* (Prakash, 1967; Anderson and Po-on Cheng, 1988) in the northern latitudes, and in the southern latitudes, *Gymnodinium catenatum, Pyrodinium bahamense* (Taylor, 1985; Anderson et al., 1989) and *Gonyaulax polyedra* (Bruno et al., 1990). The dinoflagellate cysts, deposited in marine sediments, can remain toxic for several months (Selvin et al., 1984). The composition of paralytic toxins varies enormously depending on the dinoflagellate specie from which they were isolated (Boyer et al., 1985; Cembella et al., 1987). Also there are intra-specie variations (Maranda et al., 1985; Cembella et al., 1987). However, toxin composition of a certain dinoflagellate strain, isolated from a particular geographical zone, is extremely constant.

Shellfish produces important changes in the paralytic toxin profile. Due to the differences in toxin potencies, a shellfish can change drastically its total toxicity without modifying the total quantity of toxin (Oshima et al., 1990). Other changes in the toxin profile can occur due to non enzymatic processes. Without exception, the gonyautoxins suffer epimerization, with the equilibrium displaced to the alpha forms, that are energetically more favourable (Fix Wichmann et al., 1981; Hall, 1982). The conversion speed is dependant on the pH and chemical structure, with a faster epimerization near to neutral pH. All paralytic toxins are quickly oxidized to non toxic products if the pH is not controlled during their extraction. Conditions of neutral and alkaline pH favour the oxidation. Under extremely acidic pHs (1M of free acid) carbamoyl groups are removed, while at pH 1 and 100° C. the lost group corresponds to the sulphate (sulphocarbamoyl) of the sulphocarbamoyl toxins, with a complete conversion in 5 min (Hall and Reichardt, 1984). Due to the low toxicity of the sulphocarbamoyl toxins and to the high toxicity of the carbamoyl toxins, the loss of the sulphate group produces an increase in the total toxicity.

Although it is possible to predict the time of the year, and in some parts of the world, the exact localization of the PSP proliferation, the toxicity vary enormously from year to year. Therefore, monitoring programs are absolutely necessary in order to protect the shellfish industry and the consumer. The mouse bioassay has been a standard method for PSP toxins detection and quantification for more than 50 years (Sommer and Meyer, 1937; McFarren, 1958; Helrich, 1990). Due to the use of experimental animals, the variability of the results and because the sensitivity of the mouse bioassay is very close to the regulatory limits, attempts have been made to replace this method with other methods, for example, toxin detection by HPLC. However, the mouse bioassay is simple and quick. On the other hand, this method is a direct measurement of toxicity, which is an important consideration for the security of the shellfish, particularly because of the discovery of new toxins. The HPLC method is based on a chromatographic ion pairing-separation of toxins in a RP8 column. Subsequently, through a post column derivatization, toxins are alkaline oxidated and then fluorometrically detected (Sullivan et al., 1988; Oshima et al., 1988).

The occurrence of intoxication due to paralytic toxin has increased consistently throughout the world in the past years. Until 1970, some 1700 cases of PSP have been registered, mainly in North America and Europe (Prakash et al., 1971). On the other hand, in the period 1971–1984 around 900 additional cases have been described, especially in zones of the world where PSP was practically unknown (WHO 1984). In China, PSP appeared at the beginning of the 1950s, in Japan and Norway at the end of the 1960s, in Malaysia, The Philippines, New Guinea, Australia, Indonesia, Argentina and Chile at the end of the 1970s and the beginning of the 1980s, in Sweden, Denmark, Guatemala, Venezuela, Mexico and Uruguay at the end of the 1980s and the beginning of the 1990s. Actually large parts of the world-wide coasts have or had recurrent proliferation of the PSP producer algae. This has generated a growing problem in Public Health, especially concerning the prevention of intoxication in human beings. With the continual increase in the world-wide areas that are contaminated with PSP producer algae, the areas designated for shellfish collection and cultivation are becoming more limited. This has caused a reduction in production in many areas, with a consequent socioeconomic impact of the involved fishermen. This situation is driving the need to evaluate seriously how to utilize PSP contaminated shellfish.

One alternative is to use PSP-containing shellfish detoxified to levels that are not toxic to human beings. The maximal level of PSP accepted on a world-wide basis as being safe for shellfish was 80 $\mu$g of equivalent STX for each 100 g of mollusc flesh Shellfish PSP detoxification data found in the literature are scarce and non systematic. The proposed shellfish detoxification processes can be grouped in 4 classes of strategies:

1.—Detoxification of live shellfish.

2.—Chemical treatment.

3.—Removal of the more toxic parts.

4.—Processing.

1.—Detoxification of live shellfish

This can be done by transplanting the toxic shellfish to a non toxic area. In this circumstance the shellfish suffer detoxification by depuration unless re-toxification occurs. Actually detailed information is known only about the detoxification kinetic of 3 species of scallops: *Patinopecten yessoensis, Placopecten magellanicus,* and *Chlamys nipponensis* (Medcof et al., 1947; Jamieson and Chandler, 1983; Shumway et al., 1988). The facts now available suggest that within the filter-feeding bivalve molluscs, scallops can be classified as species that retain the toxins for a long time. For example, the retention of paralytic toxins in *P. magellanicus* has been identified for periods that run from several months to 2 years (Medcof et al., 1947; Jamieson and Chandler, 1983; Shumway et al., 1988). Certain tissues of *P. magellanicus,* particularly the digestive glands and rims, can remain toxic through a year (Bourne, 1965; Shumway et al., 1988). Very similar results were observed for the pink scallop *Chlamys hastata* (Nishitani and Chew, 1988).

Despite the fact that this method is technically feasible, the cost to transfer, transplant and re-seed makes this decontamination procedure economically impracticable.

2.—Chemical treatment

Knowing the paralytic toxin formulas and together with some empirical observations, Hayes (1966) proposed that toxins could be extracted and/or destroyed under acidic conditions, particularly in the presence of oxygen. Based on this observation, experiments were carried out in Alaska with live and dead clams and clam flesh under acidic conditions. It was observed that at a pH as low as 5.0, a reduction of the toxicity levels was not observed (Hayes, 1966).

3.—Removal of the more toxic parts

The PSP toxins distribution in bivalve shellfish tissues are variable and it has been demonstrated that the distribution depends on the species involved. The most studied shellfish are scallops and clams. In FIG. 2 the most important anatomical parts of scallops and clams are depicted.

In general, it has been determined that the digestive glands (hepatopancreas and liver) usually possess the highest levels of paralytic toxins. Rims (mantels, rings, or borders), gills and gonads (roe) also possess significant quantities of paralytic toxins, although levels lower than those from the digestive glands. Finally, adductor muscles and the foot are tissues that always, except in a very few instances, possess very low levels of toxins (see Table 1) (Shumway and Cembella, 1993; Cembella et al., 1993; Cembella and Shumway, 1995).

TABLE 1

Anatomical distribution of paralytic toxins in scallop and clam.

| Mullusc | Tissue | Relative contribution to the total weight (%) | Relative toxicity (% of total toxicity) |
|---|---|---|---|
| Scallop | Digestive gland | 21 | 69–75 |
|  | Rim | 11 | 23–27 |
|  | Gonad | 23 | 1–2 |
|  | Gill | 10 | 1–2 |
|  | Adductor Muscle | 36 | <1 |
| Clam | Digestive gland | 18 | 37 |
|  | Rim | 14 | 20 |

TABLE 1-continued

Anatomical distribution of paralytic toxins in scallop and clam.

| Mullusc | Tissue | Relative contribution to the total weight (%) | Relative toxicity (% of total toxicity) |
|---|---|---|---|
|  | Siphons | 10 | 13 |
|  | Gill | 6 | 21 |
|  | Foot | 30 | 7 |
|  | Adductor muscle | 22 | 2 |

*Data obtained from Shumway and Cembella, 1993; Cembella et al., 1993; Cembella and Shumway, 1995.

One of the clearest examples of the utilization of this "decontamination" procedure applies to scallops. In North America, the effects of algal blooms on scallop cultivations are ignored, since only the adductor muscle is consumed. As indicated in table 1, the adductor muscle is frequently the tissue with the lowest level of paralytic toxins. Once scallops are harvested, almost immediately the adductor muscle is removed and the rest of the tissues together with the shells, are discarded. The discarded tissues, and those include rim (mantel, rings or borders), gonad (roe), digestive gland (hepatopancreas, liver) and gills, correspond to approximately 65% of the total mollusc weight (Cembella et al., 1993).

However, in some markets, such as Latin America, Europe and Australia, scallops are sold together with the gonad, or whole. In this case, as well as in many other cases, where molluscs are sold, this procedure is not applicable.

4.—Processing 4.1.—Cooking and canning

It have been described that just the cooking of contaminated molluscs can reduce their toxicity level. Initial work with paralytic toxins demonstrated that the heat could destroy an important portion of the toxins. Medcof et al. (1947) and Quayle (1969) described the reduction of total toxicity of toxic fresh molluscs when these were subjected to home cooking processes, like boiling or frying. They also demonstrated, using a clam (*Mya arenaria*), that commercial canning was more effective than domestic cooking in reducing the PSP toxicity. It was demonstrated that pre-cooking with water vapour for 10 min, of low PSP toxicity shellfish, succeeded in reducing their toxic levels in approximately 90%, but posterior treatments with water vapour didn't succeed in further reducing toxicity. A latter treatment in an autoclave at 121° C. (250° F.) for 45 min reduced the toxic content only an additional 3%, and 90 min in an autoclave caused an additional reduction of 1%. Quayle (1969), Prakash et al. (1971), Noguchi et al. (1980) and Berenguer et al. (1993) have contributed important observations concerning toxicity reduction during commercial canning process. Recently, it has also been reported that the speed of thermal degradation of some PSP toxins depends on the type of toxin involved and on the temperature (Nagashima et al., 1991).

Table 2 summarized some data obtained on toxicity reduction by commercial canning. In general, it was observed that the commercial canning of molluscs that possess an initial toxicity greater than 1000 mg STX eq./100 g achieves a significant decontamination level, but their final toxicity is not adequate for human consumption. This detoxification procedure by canning would only serve for the decontamination, with certain level of security, of molluscs that possess up to 500 $\mu$g STX eq./100 g.

4.2.—Freezing

Short freezing times do not reduce substantially the PSP toxin levels. Only after several months of storage at −20° C.

were small reductions in toxicity detected. However, the freezing of whole molluscs results in a migration of toxins from more to fewer toxic parts, for example, from digestive glands to adductor muscles. This phenomenon is also achieved during the thawing of the molluscs (Shumway and Cembella, 1993).

TABLE 2

PSP toxicity ($\mu$g of saxitoxin equivalent per 100 g of mollusc) in raw material and in final canned product.

Toxicity ($\mu$g STXeq./100 g)*

| Mollusc | Raw material toxicity | Canned product toxicity ** | Reference |
|---|---|---|---|
| Mya arenaria | 5,000–6,000 | 310 @ | Medcof et al., 1947 |
| | 1,300 | 200 @ | |
| | 1,000–1,100 | <200 | |
| | 500–1,000 | <200 | |
| | 250–500 | <200 | |
| | 200–250 | <200 | |
| | 700–800 | <200 | |
| | 5,000–5,800 | 310 @ | |
| Saxidomus giganteus | 192 | 32 | Quayle, 1969 |
| | 48 | 32 | |
| | 126–176 | 32 | |
| | 240 | 32 | |
| | 192–352 | 32 | |
| | 368–560 | 32 | |
| | 787 | 102 @ | |
| | 66 | 32 | |
| | 78 | 32 | |
| | 144 | 32 | |
| | 149 | 32 | |
| | 284 | 32 | |
| | 1,126 | 81 @ | |
| | 415 | 109 @ | |
| Mya arenaria | 112–138 | <32 | Prakash et al., 1971 |
| | 800–930 | 50 | |
| | 800–960 | 50 | |
| | 210 | 32 | |
| | 160–175 | <32 | |
| | 80–160 | <32 | |
| | 40–80 | <32 | |
| | 32–40 | <32 | |
| Acanthocardia tuberculatum L. | 799 | <35 | Berenguer et al., 1993 |
| | 803 | <35 | |
| | 269 | <35 | |
| | 428 | <35 | |

* Toxicity level was determined by mouse bioassay.
** All molluscs were canned as wholes.
@ Molluscs not for human consumption.

BRIEF SUMMARY OF THE INVENTION

In the present invention an effective procedure for the decontamination of paralytic toxin contaminated shellfish is described. Decontamination is achieved through an industrial procedure that involves the chemical treatment of shellfish. Said chemical treatment consists in cooking shellfish in an alkaline pH solution. This treatment can be combined with one or several other procedures for a reduction in the final toxicity of the product, for example partial shellfish detoxification by depuration, removal of the more toxic parts, and commercial cooking/canning. This procedure succeeds in reducing the total toxicity of the shellfish to levels lower than 80 $\mu$g/100 g shellfish, independently on the toxin profile present and of the initial toxicity of the shellfish. This is the first known industrial process that can ensure shellfish decontamination with results which are 100% compatible with the international regulatory norms for human consumption.

BRIEF DESCRIPTION OF THE DRAWINGS

FIG. 1 represents the structure of the paralytic shellfish poisoning toxins.

FIG. 3A–FIG. 3C show various paralytic toxin profiles from mussels submitted to decontamination process by alkaline treatment; with bar graph 3 (FIG. 3A) Initial material, total calculated toxicity: 7,816 $\mu$g STX eq./100 g; and bar graph 3 (FIG. 3B) further shows first treatment with 100 mM bicarbonate pH 9.0, total calculated toxicity: 408 $\mu$g STX eq./100 g; and lastly and bar graph 3 (FIG. 3C) shows a second treatment with 100 mM bicarbonate pH 9.0, total calculated toxicity: 61 $\mu$g STX eq./100 g.

DETAILED DESCRIPTION OF THE INVENTION

Figure 2A:
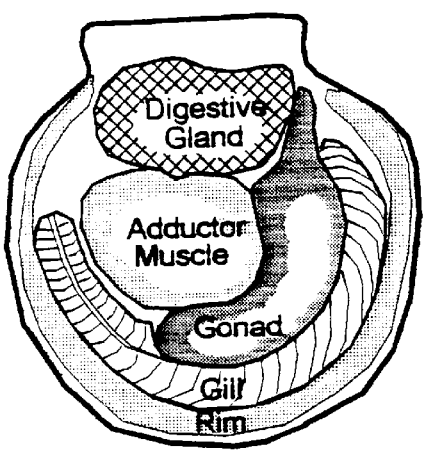
FIGS. 2A and 2B show the anatomical descriptions of a scallop and a clam.
Figure 2B:
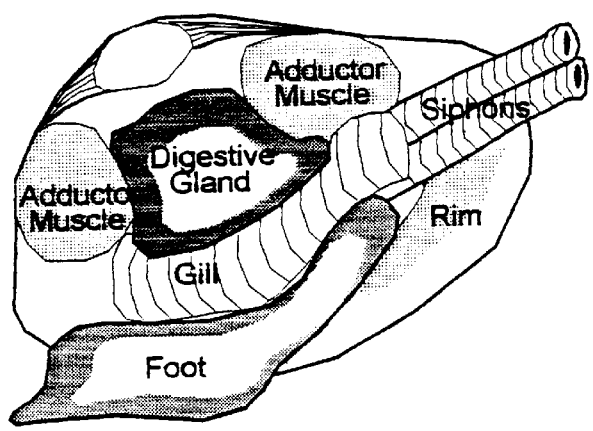

In the present invention an effective procedure for the decontamination of paralytic toxin contaminated shellfish is described. Such procedure consists in a chemical treatment of shellfish, combined or not with one or several other procedures for a reduction in the final toxicity of the product. The additional procedures can be selected from: partial shellfish detoxification by deputation, removal of the more toxic parts, and commercial cooling/canning.

The shellfish can be fresh live, fresh dead, frozen, pre-cooked (by water vapour treatment, autoclave, boiled, fried, etc.), with or without shell, whole or chopped. This mollusc can be whatever species of monovalve such as snails, locos, abalons, limpets, etc.; or any species of bivalves such as all kind of mussels, big mussels, Chilean mussels, clams, oysters, scallops, tumbaos, culengues, navajas, navajuelas, machas, picorocos, etc.; or any another species of shellfish. Any other marine food product contaminated with PSP toxins can also be included in this decontamination procedure.

The alkaline treatment consists of submerging paralytic toxin contaminated shellfish in an alkaline pH solution and then submitting them to a thermal process. The alkaline solution can be obtained using any buffer that is able to regulate the pH to alkaline values. For example the following buffers can be used: carbonate/bicarbonate; carbonate/sodium hydroxide; sodium hydroxide; $H_2PO_4^-/HPO_4^{2-}$; $HPO_4^{2-}/PO_4^{3-}$; citrate/sodium hydroxide; barbital; barbital/HCl; barbital/sodium hydroxide; borate; borate/HCl; borate/boric acid; borate/sodium hydroxide; aminoacid; aminoacid/sodium hydroxide; phosphate/borate; phosphate/citrate; citrate-phosphate-borate/HCl; imidazole/HCl; Trizma/HCl; Tricine/HCl, among others. The concentration of this alkaline solution can vary from 1 mM up to 5 M, more specifically between 5 mM and 2 M, depending on the product to be treated and on the quantity of toxin to be destroyed.

By alkaline pH is meant any pH that is equal to or above 6.0. The more alkaline the pH the more efficient the paralytic toxin destruction. The maximum alkaline pH that it is possible to use will depend on the product being treated, the initial toxicity, and the capacity of the product to maintain an organoleptic characteristic acceptable for human consumption.

The shellfish immersion time can vary from some seconds up to 2 days. In general, time is selected in order to permit the complete imbibition of the shellfish with the alkaline solution and its diffusion to the contaminated tissues. Then, the time will depend on the shellfish size; their form of presentation, that is, if molluscs are or not shucked, if the molluscs are whole or not, if they have been pre-cooked or not, etc.; and if they are live or not. The live shellfish aspire the alkaline solution through the siphons and, in these conditions, it diffuse faster to the inside of the shellfish The thermal process is important for the paralytic toxin destruction. Once molluscs are contacted and completely imbibed with the alkaline solution, the shellfish are thermally treated by boiling in the treatment solution, or by injection of hot water vapour directly in the imbibed shellfish, or by autoclave of the imbibed shellfish, among other possibilities. The time and the temperature of the treatment will depend on the shellfish being treated and on the amount of toxin that is necessary to destroy. In general, it can vary between 10 seconds to 5 hours.

It is possible that not enough toxin is destroyed to bring the final level of toxicity down to the permitted levels. In this case it is possible to repeat the alkaline treatment as many times as necessary.

Using this process it is possible to destroy the toxins in the contaminated shellfish, to reach acceptable levels of toxicity for human consumption.

During the cooking of the contaminated shellfish in the presence of the alkaline solution, besides destruction, an extraction of toxins from the shellfish occur. The supernatant liquid contains an important amount of toxin, initially present in the shellfish. This phenomenon also produces a migration of the toxins within the shellfish from more to less contaminated parts, for example, from digestive glands to adductor muscles and the foot. Thus, in highly PSP contaminated shellfish, it may be necessary to remove the more toxic parts prior to alkaline treatment, thus avoiding contamination by toxin diffusion The toxins extracted from the shellfish using the alkaline treatment, remain in the liquids in which shellfish are submerged. These can be removed, and/or concentrated using well-known methods and technique, or be destroyed totally through the alkaline treatment described in this invention, using, if necessary, more drastic conditions.

To optimize the industrial decontamination procedure and utilize this procedure with raw materials containing high toxicity levels, the alkaline treatment can be associated with other already existent procedures for toxin decontamination. For example, in a same production line can exist, besides the alkaline treatment, one or several (or all) treatments that can include partial depuration of shellfish, removal of the more toxic parts and commercial cooking/canning.

a) Partial deputation

The production plant can be equipped with depuration pools. These pools can be filled with non-PSP contaminated seawater and shellfish can be deposited there for variable times. The presence of non contaminated seawater will permit the reduction of the initial toxin load in the shellfish. The time of treatment can vary from hours up to weeks depending on the shellfish and on the initial toxicity. Subsequently the shellfish are collected and subjected to the industrial decontamination process of this invention, and canning.

b) Removal of the most toxic parts

Great part of shellfish can be commercialized as a non whole product. Thus, there can exist tongue or foot canned from diverse types of shellfish, like for example machas, clams, tumbaos, culengues, navajas, navajuelas, or adductor muscles from scallops. In this case these products have the siphons, rims, digestive glands, gills and gonads eliminated, constituting generally the most contaminated tissues. The residual toxicity of the adductor muscles and tongues or feet can be eliminated through the alkaline treatment.

On the other hand, discards of the canning process of tongues or feet and adductor muscles, especially rims and in some cases gonads and siphons, can be decontaminated using the alkaline treatment and then used for the elaboration of other canned products, for example soups, shellfish paste, etc.

c) Commercial cooking/canning

Because cooking/canning is a normal stage of the canning process for shellfish, the inventive treatment described also takes advantage of it for the decontamination of PSP toxins. As noted, the canning of contaminated shellfish itself can reduce to a great extent the toxicity levels. Therefore, if the alkaline treatment doesn't reduce the total toxicity to permitted levels, the subsequent canning can often reduce them to safe levels.

The pH of the final product must be regulated to control both the organoleptic characteristic and the reologic properties of the shellfish. This regulation is carried out easily when the treated products are destined for commercial canning. The pH can be controlled by the addition of a covering liquid that contains a buffer to the appropriate pH or an acid. This can be selected, for example, from acetic acid, citric acid, ascorbic acid, butyric acid, phosphoric acid, hydrochloric acid, glutamic acid, any aminoacid, ftalic acid, succinic acid, pyruvic acid, glyceric acid, malic acid, boric acid, acetic/acetate, $H_3PO_4/H_2PO_4^-$, $H_2PO_4^-HPO_4^{2-}$, polyphosphate, tripolyphosphate, EDTA, among others. Within these compounds those that improve the organoleptic, reologic or any another properties of the final product's acceptability, are preferred. For example phosphates and polyphosphates produce an increment in the water retention capacity of canned shellfish, ascorbic acid possesses antioxidant properties, etc. The possibility of utilizing other buffers as the covering liquid that give other interesting properties to the final product, is also possible.

If the decontamination procedure by alkaline treatment destroys >90% of toxins, and the removal of the more toxic parts and cooking/canning decrease by 90% and 80% the shellfish toxins, respectively, then a process that involves all three stages of decontamination could theoretically diminish toxicity levels as high as 40,000 $\mu$g STX equivalent/100 g. to permitted levels. However, these high levels of toxicity are not frequent, and usually the toxicity level in the PSP-endemic zones oscillates between 80 and 10,000 $\mu$g STX equivalent/100 g. Thus this decontamination procedure is applicable to any kind of mollusc from PSP-endemic zones.

EXAMPLE 1

Detoxification of Mussels Contaminated with Paralytic Toxin using an Alkaline pH Treatment Mussels were collected from the XII region of Chile, a zone that possess an endemic problem with an *Alexandrium catenella* bloom. The samples were contaminated with paralytic toxin with a toxicity level of 6,800 $\mu$g STX eq./100 g, measured by mouse bioassay, or 7,816 $\mu$g STX eq./100 g, measured by HPLC. The samples were submitted to the alkaline treatment for 24 hours after their catch. During their transit samples were kept refrigerated at 4° C.

Live mussels, whole and with shell, were submerged in 100 mM sodium bicarbonate solution (pH 9.0) and were incubated 1 hour at room temperature. Subsequently, the shellfish were washed with abundant water, submerged again in 100 mM sodium bicarbonate solution (pH 9.0) and boiled for 20 minutes. After cooling at room temperature, mussels were chucked by hand and washed with abundant water. Analysis of these samples revealed that the toxicity was 550 $\mu$g STX eq./100 g, measured by mouse bioassay, or 408 $\mu$g STX eq./100 g. measured by HPLC (FIG. 3A), reaching a reduction of 91.9% (bioassay) or 94.8% (HPLC) in their initial toxicity.

A second treatment of mussels with a fresh solution of bicarbonate, in the same conditions described previously, reduced the final toxicity to 69 $\mu$g STX eq./100 g. measured by mouse bioassay, or 61 $\mu$g STX eq./100 g, measured by HPLC (FIG. 3B). The percentage of decontamination was 99.0% (bioassay) or 99.9% (HPLC) relative to the initial toxicity. This second treatment with the alkaline solution reduced the toxicity levels to a safe level which is completely acceptable for human consumption.

A single alkaline treatment of fresh chucked mussels reduced the initial toxicity by 96.8% (bioassay) or 95.3% (HPLC). The better efficiency of this treatment could be due to the improvement in the alkaline solution accessibility to the contaminated tissues.

The paralytic toxin profile changed drastically due to the alkaline treatment (see FIG. 3C). Observe that GTXs toxins and the neosaxitoxin were principally destroyed. Their proportion in treated shellfish decrease substantially relative to that of the initial raw material. On the other hand, saxitoxin was slowly destroyed, increasing their relative proportion in the treated products.

The biotoxicologic assay was carried out according to the method of Helrich (1990) and corresponds to the official method of the A.O.A.C (Association of Official Analytical Chemists). As the standard for mouse bioassay calibration, an international standard of STX, kindly donated by Dr. S. Hall, Food and Drug Administration, Washington, DC, was used. Briefly, 100 g of shellfish, previously milled, were homogenized with 100 mL of HCl 0.1N, the pH was adjusted to <4.0, when necessary, and then boiled for 5 min. After cooling, final volume was adjusted to 200 mL and then filtered 1 mL of filtrate was injected intraperitoneally to a preweight mouse (15–21 grams) and the death time was registered. Using the Sommer and Meyer table (Sommer and Meyer, 1937; Helrich, 1980) and according to the death time, mouse units were calculated and corrected by the mouse weight. The $\mu$g STX eq./100 g were calculated through the calibration with an international standard of STX.

The HPLC analysis was carried out basically as described by Oshima et al. (1988). Briefly, the acid extracts utilized for the mouse bioassay, were chromatografied in a Sep Pak C18™ column (Waters Co) and then deproteinized by ultrafiltration (Milipore Ultrafree C3GC™ membrane, exclusion 10,000 PM). The eluted was injected into a HPLC equipped with a RP8 column and subjected to an elution at 0.8 mL/min with buffer A (2 mM sodium 1-heptanesulfonate in 10 mM ammonium phosphate pH 7.2) for the GTXs toxins and dcGTXs, and an elution with buffer B (A:acetonitrile=9:1), for the STX toxins, NEO and dcSTX. The detection was carried out with a post column derivatization with 0.4 mL/min of 7 mM peryodic acid in 50 mM sodium phosphate pH 9.0, heating at 65° C. in a 10 meter Teflon™ tube (0.5 mm i.d.), and 0.4 mL/min of 0.4 M acetic acid, and detection with fluorescence detector (ex 330 nm; em 390 nm).

EXAMPLE 2

An Industrial Decontamination Process of PSP Toxin Containing Shellfish

This example describes an industrial decontamination procedure for culengue. This bivalve shellfish was collected in a zone endemically contaminated with paralytic toxin and then transported to a canning plant in order to carry out the experiment. Three shellfish samples that possessed different toxicity levels were collected. The assay was carried out on processing the culengues in 3 batches of approximately 300 kilos each (a batch per sample). In order to carry out the analysis, 10 kilograms of randomly taken samples, were collected In order to do a representative analysis the whole sample was homogenized and aliquots were utilized for the PSP determination by mouse bioassay and HPLC.

Figure 4A:
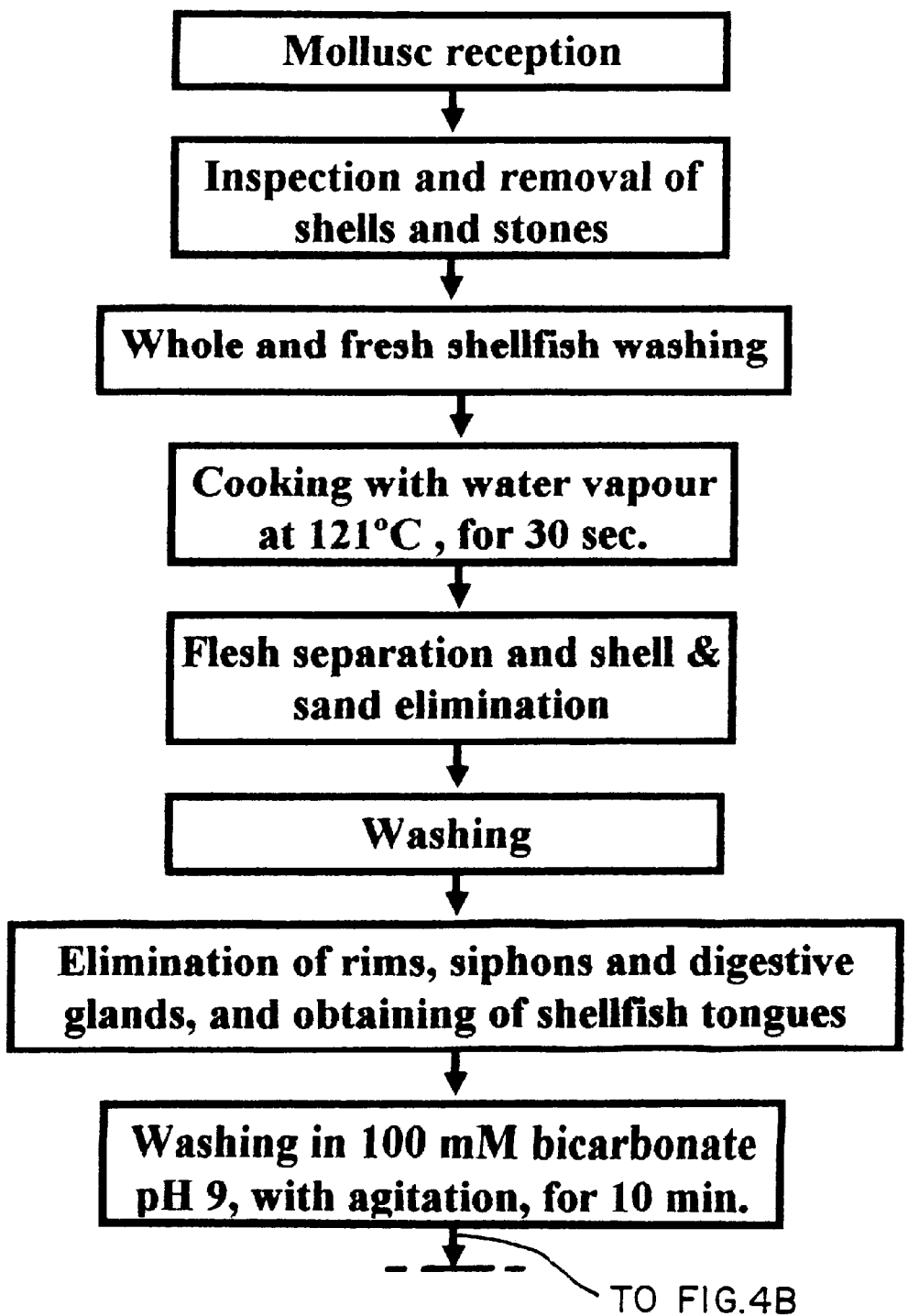
FIGS. 4A and 4B show (on two drawing sheets) a single flow diagram of the industrial process destined to the decontamination and canning of culengue. The cover liquid employed was 2% (w/v) NaCl, 0.5% (w/v) sodium polyphosphate, 0.015% (w/v) EDTA, 0.1% (w/v) citric acid. The autoclaving was carried out at 115° C. for 45 min.
Figure 4B:
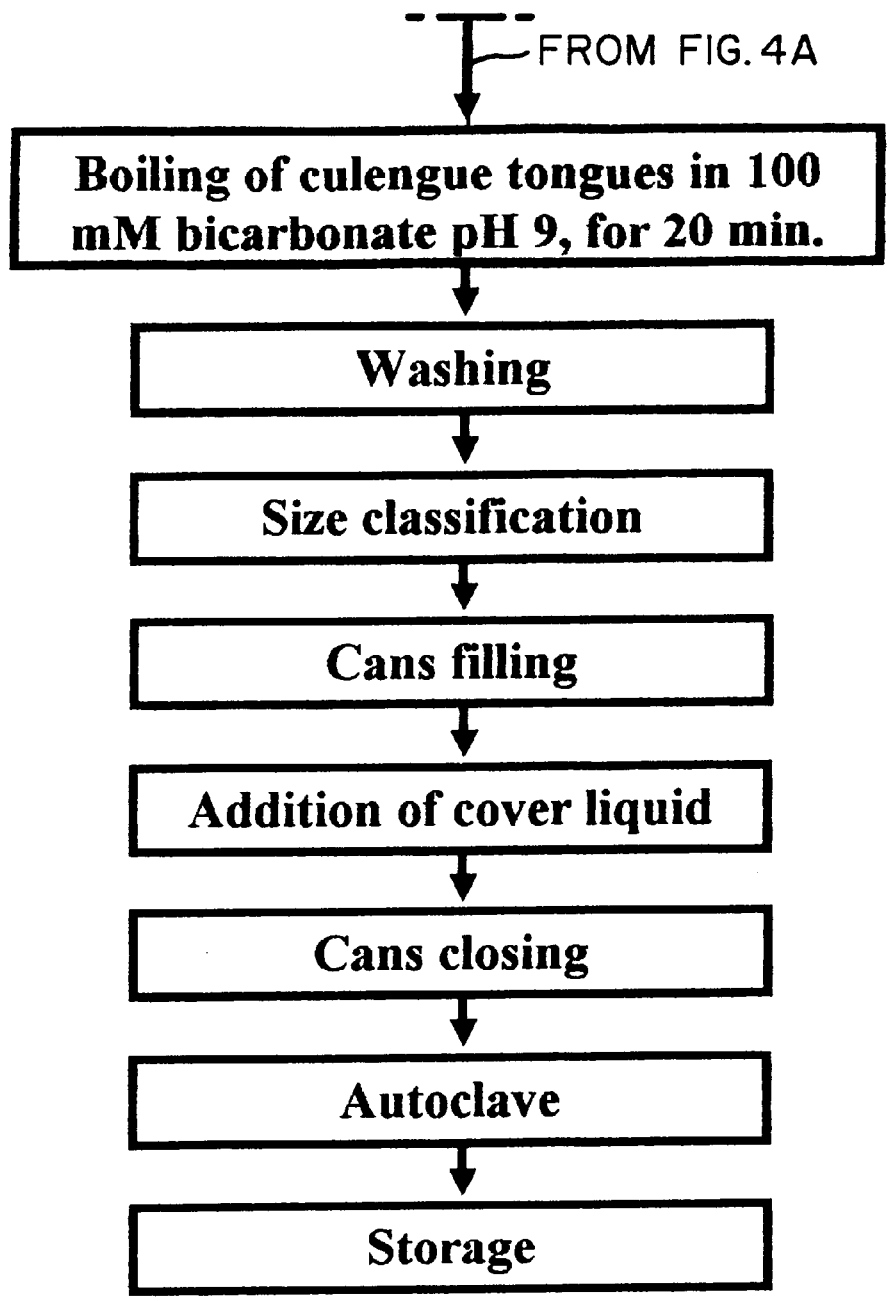

The industrial process used is detailed in the flow diagram described in the FIG. 4. The process is a continuous process for traditional shellfish canning in which variations were done in order to include the toxin decontamination steps.

The results obtained in this process were summarized in the table 3. With the 3 processes a considerable reduction in the culengues toxicity was achieved. The reduction in toxicity was always greater than 90%. The final toxicity of the canned products permitted their commercialization and they were below the established limits for the prohibition of consumption.

TABLE 3

Content of PSP toxins ($\mu$g saxitoxin equivalent/100 g) in fresh raw material in the final product decontaminated/canned.

| Toxicity ($\mu$g STX eq./100 g) | | Percentage of |
| --- | --- | --- |
| Fresh raw material | Canned final product | toxicity reduction (%) |
| 2560 | <35 | >98 |
| 1803 | <35 | >98 |
| 489 | <35 | >93 |
| 2943 | 48 | 98 |
| 1760 | 35 | 98 |
| 567 | 28 | 95 |

REFERENCES

Anderson, D. M. and Po-on Cheng, T. 1988. Intracellular localization of saxitoxin in the dinoflagellate *Gonyaulax tamarensis*. J. Phycol. 24: 17–22.

Anderson, D. M., Sullivan, J. J. and Reguera, B. 1989. Paralytic shellfish poisoning in northwest Spain: The toxicity of the dinoflagellate *Gymnodinium catenatum*. Toxicon 27: 665–674.

Anderson, D. M., Kulis, D. M., Sullivan, J. J. and Hall, S. 1990. Toxin composition variations in one isolate of the dinoflagellate *Alexandrium fundyense*. Toxicon 28: 885–894.

Bates, H. A., Kostriken, R. and Rapoport, A. 1978. The occurrence of saxitoxin and other toxins in various dinoflagellates. Toxicon 16: 595–601.

Berenguer, J. A., Gonzalez, L., Jimenez, I., Legarda, T. M., Olmedo, J. B. and Burdaspal, P. A. 1993. The effect of commercial processing on the paralytic shellfish poison (PSP) content on naturally-contaminated *Acanthocardia tuberculatum* L. Food Add Contamin. 10: 217–230.

Bourne, N. 1965. Paralytic shellfish poison in sea scallops (*Placopecten magellanicus*, Gmelin). J. Fish. Res. Board Can 22: 1137–1149.

Boyer, G. L., Sullivan, J. J., Andersen, R. J., Harrison, P. J. and Taylor, F. J. R. 1985. Toxin production in three isolates of Protogonyaulax sp. In "Toxic Dinoflagellates" (Anderson, D. M., White, A. W. and Baden, D. G. Eds.) Elsevier Science Publishing Co Inc., New York, pp. 281–286.

Bruno, M., Gucci P. M. B., Pierdominici, E., Ioppolo, A. and Volterra, L. 1990. Short Communications. Presence of Cembella, A. D. and Shumway, S. E. 1995. Anatomical and spatio-temporal variations in PSP toxin composition in natural populations of the surfclam *Spisula solidissima* in the Gulf of Maine. In "Harmful Marine Algal Blooms" (Lassus, P., Arzul, G., Erard, E., Gentlen, P. and Marcaillou, C. Eds.) Lavoisier, Intercept Ltd., pp. 421–426.

Cembella, A. D., Sullivan J. J., Boyer, G. L., Taylor, F. J. R. and Anderson, R. J. 1987. Variations in paralytic shellfish toxin composition within the *Protogonyaulax tamarensis/catenella* species complex; Red tide dinoflagellates. Biochem. System. Ecol. 15: 171–186.

Cembella, A. D., Shumway, S. E. and Lewis, N. I. 1993. Anatomical distribution and spatio-temporal variation in paralytic shellfish toxin composition in two bivalve species from the Gulf of Maine. J. Shellfish Res. 12: 389–403.

Desbiens, M., Coulombe, F., Gaudreault, J., Cembella, A. D. and Larocque, R. 1990. PSP toxicity of wild and cultured blue mussels induced by *Alexandrium excavatum* in Gaspe Bay (Canada): Implications for aquaculture. In "Toxic Marine Phytoplankton" (Graneli, E., Sundstrom, B., Edler, L. and Anderson, D. M. Eds.) Elsevier Science Publishing Co Inc., New York, pp. 459–468.

Fix Wichmann, C. F., Niemczura, W. P., Schnoes, H. K., Hall, S., Reichardt, P. B. and Darling, S. D. 1981. Structures of two novel toxins from Protogonyaulax. J. Am. Chem. Soc. 103: 6977–6978.

Hayes, M. L. 1966. Acid pre-treatment to remove paralytic shellfish poison from butter clams (*Saxidomus giganteus*). Technical Report N° 72. U.S. Fish and Wildlife Service, Bureau of Commercial Fisheries, Technological Laboratory, Ketchikan, Alaska.

Hall, S. 1982. Toxins and Toxicity of Protogonyaulax from the northeast Pacific. Ph. D. Thesis. University of Alaska.

Hall, S. and Reichardt, P. B. 1984. Cryptic paralytic shellfish toxins. In "Seafood toxins" (Ragelis, E. P. Ed.). American Chemical Society, Washington, D.C. pp. 113–123.

Helrich, K. 1990. "Official Methods of Analysis of the Association of Official Analytical Chemists", 15th ed. Arlington, Va.: AOAC Inc., pp. 881–882.

Jacobi, P. A., Martinelli, M. J. and Polanc, S. 1984. Total synthesis of (±) saxitoxin. J. Am. Chem. Soc. 106: 5594–5598.

Jamieson, G. S. and Chandler, R. A. 1983. Paralytic shellfish poison in sea scallops (*Placopecten magellanicus*) in the west Atlantic. Can. J. Fish. Aquat. Sci. 40: 313–318.

Kao, C. Y. 1966. Tetrodotoxin, saxitoxin and their significance in the study of excitation phenomena. Pharmacol. Rev. 18: 997–1049.

Kishi, Y. 1980. Total synthesis of d,l-saxitoxin. Heterocycles 14: 1477–1495.

Maranda, L., Anderson, D. M. and Shimizu, Y. 1985. Comparison of toxicity between populations of *Gonyaulax tamarensis* of Eastern North American waters. Estuarine Coastal and Shelf Science 21: 401–410.

Martinelli, M. J., Browstein, A. D. and Jacobi, P. A. 1986. The azomethine imine route to guanidines. Total synthesis of (±)-saxitoxin. Croatia Chemica Acta 59: 267–295.

McFarren, E. F., Schantz, E. J., Campbell, J. E. and Lewis, K. H. 1958. Chemical determination of paralytic shellfish poison in clams. J. Assoc. Off. Anal. Chem. 41: 168–177.

Medcof, J. C., Leim, A. H., Needler, A. B., Needler, A. W. H., Gibbard, J. and Naubert, J. 1947. Paralytic shellfish poisoning on the Canadian Atlantic coast. Bull. Fish. Res. Board Can. 75: 1–32.

Nagashima, Y., Noguchi, T., Tanaka, M. and Hashimoto, K. 1991. Thermal degradation of paralytic shellfish poison. J. Food Sci. 56: 1572–1575.

Nishitani, L. and Chew, K. 1988. PSP toxins in the Pacific coast states: monitoring programs and effects on bivalve industries. J. Shellfish Res. 7: 653–669.

Noguchi, T., Ueda, Y., Onoue, Y., Kono, Koyama, K., Hashimoto, K., Takeuchi, T., Seno, Y. and Mishima, S. 1980. Reduction in toxicity of highly PSP infested scallops during canning process and storage. Bull. Jap. Soc. Scientific Fish. 46: 1339–1344.

Oshima, Y., Sugino, K. and Yasumoto, T. 1988. Latest advances in HPLC analysis of paralytic shellfish toxins. In "Mycotoxins and Phycotoxins '88" (Natori, S., Hashimoto, K. and Ueno, Y. Eds.) Amsterdam, Elsevier Science Publishers B. V., pp. 319–326.

Oshima, Y., Sugino, K. Itakura, H., Hirota, M. and Yasumoto, T. 1990. Comparative studies on paralytic shellfish profile of dinoflagellates and bivalves. In "Toxic Marine Phytoplankton" (Graneli, E., Sundstrom, B., Edler, L. and Anderson, D. M. Eds.) Elsevier Science Publishing Co Inc., New York, pp. 391–396.

Oshima, Y., Bolch, C. J. and Hallegraeff, G. M. 1992. Toxin composition of resting cysts of *Alexandrium tamarense* (Dinophyceae). Toxicon 30: 1539–1544.

Prakash, A. 1967. Growth and toxicity of a marine dinoflagellate, *Gonyaulax tamarensis*. J. Fish. Res. Bd. Canada 24: 1589–1600.

Prakash, A., Medcof, J. C. and Tennant, A. D. 1971. Paralytic shellfish poisoning in Eastern Canada. Bull. Fish. Res. Board Can. 117:1–88.

Proctor, N. H., Chan, S. L. and Trevor, A. J. 1975. Production of saxitoxin by cultures of *Gonyaulax catenella*. Toxicon 13: 1–9.

Quayle, D. B. 1969. Paralytic shellfish poisoning in British Columbia. Bull. Fish Res. Board Can. 168:1–69.

Salkowski, E. 1885. Zur kenntniss des giftes der miesmuschel (*Mytilus edulis*). Virchows Arch. Path. Anat. u Physiol. 102: 578–592.

Schantz, E. J., Mold, J. D., Stranger, D. W., Shavel, J., Riel, F., Bowden, J. P., Lynch, J. M., Wyler, R. S., Riegel, B. and Sommer, H. 1957. Paralytic Shellfish poison. VI. A procedure for the isolation and purification of the poison from toxic clam and mussel tissues. J. Am. Chem. Soc. 79: 5230–5235.

Schantz, E. J., Lynch, J. M., Vayada, G., Masumoto, K. and Rapoport, H. 1966. The purification and characterization of the poison produced by *Gonyaulax catenella* in axenic culture. Biochemistry 5: 1191–1195.

Schuett, W. and Rapopport, H. 1962. Saxitoxin, the paralytic shellfish poison. Degradation to a pyrrolopyrimide. J. Am. Chem. Soc. 84: 2266–2267.

Shumway, S. E. and Cembella, A. D. 1993. The impact of toxic algae on scallop culture and fisheries. Rev. Fish. Sci. 1: 121–150.

Shumway, S. E., Sherman-Caswell, S. and Hurst, J. W. Jr. 1988. Paralytic shellfish poisoning in Maine: monitoring a monster. J. Shellfish Res. 7: 643–652.

Selvin, R. C., Lewis, C. M., Yentsch, C. M. and Hurst, J. W. 1984. Seasonal persistence of resting cyst toxicity in the dinoflagellate *Gonyaulax tamarensis* var. excavata. Toxicon 22: 817–820.

Sommer, H. and Meyer, K. F. 1937. Paralytic shellfish poisoning. Arch Path. 24: 569–598.

Sullivan, J. J., Iwaoka, W. T. and Liston, J. 1983. Enzymic transformations of PSP toxins in the little neck clam (*Protothaca staminea*). Biochem. Biophys. Res. Comm. 114: 465–472.

Sullivan, J. J., Wenkell, M. and Hall, S. 1988. Detection of paralytic shellfish toxins. In "Handbook of Natural Toxins 3: Marine Toxins and Venoms" (Tu, A. T. Ed.) Marcel Dekker Inc., New York, pp. 87–106.

Tanino, H., Nakata, T., Kaneko, T. and Kishi, Y. 1977. A stereospecific total synthesis of d,l-saxitoxin. J. Am. Chem. Soc. 99: 2818–2819.

Taylor, F. J. R. 1985. The taxonomy and relationships of red tide flagellates. In "Toxic Dinoflagellates" (Anderson, D. M., White, A. W. and Baden, E. G. Eds.) Elsevier Science Publishing Co Inc., New York, pp. 11–26.

WHO. 1984. Aquatic (Marine and Freshwater) Biotoxins. Environmental Health Criteria 37. International Programme on Chemical Safety, World Health Organization, Geneva.

What is claimed is:

1. A detoxification process for shellfish contaminated with paralytic shellfish poisoning (PSP) toxins, comprising the steps of: submerging live shellfish completely in an alkaline solution having one or more alkaline buffers for a predetermined time, allowing said shellfish to imbibe for a time for allowing accumulation of buffer inside said shellfish, and then subsequently submitting said shellfish to a thermal heat treatment step, and further optionally treating said shellfish with at least one of several other treatments selected from the group consisting of: depuration of the contaminated shellfish, removal of their toxic parts, commercial cooking and canning ; whereby buffer concentration in said live shellfish is readily achieved by said shellfish so as to produce greater toxin destruction during the thermal heat treatment step.

2. The shellfish detoxification process according to claim 1, wherein in addition to said live shellfish, said shellfish is one selected from the group consisting of fresh shellfish, pre-cooked shellfish with shell, shelled shellfish, and shellfish parts.

3. The shellfish detoxification process according to claim 1, wherein said shellfish comprises any species of shellfish or marine products contaminated with paralytic shellfish poisoning toxins.

4. The shellfish detoxification process according to claim 3, wherein said shellfish is one further selected from the group consisting of any species of bivalve including different types of mussels, big mussels, Chilean mussels, different types of clams, different types of oysters, different types of scallops, tumbaos, culenges, navajas, navajuelas, machas, picorocos, and any other contaminated product of marine origin contaminated with paralytic shellfish poisoning toxins.

5. The shellfish detoxification process according to claim 1, wherein the alkaline solution is selected from the group consisting of at least one of the following buffers: carbonate/bicarbonate; carbonate/sodium hydroxide; sodium hydroxide; $H_2PO_4^-/HPO_4^{2-}$; $HPO_4^{2-}/PO_4^{3-}$; citrate/sodium hydroxide; barbital; barbital/HCl; barbital/sodium hydroxide; borate; borate/HCl; borate/boric acid; borate/sodium hydroxide; any aminoacid; any aminoacid/sodium hydroxide; phosphate/borate; phosphate/citrate; and a HCl solution with citrate-phosphate-borate; imidazol; Trizma; or Tricine and mixtures thereof.

6. The shellfish detoxification process according to claim 5, wherein concentration of the alkaline buffer is from 1 mM up to 5 M, commensurate with the shellfish being treated and with the toxin that is desired to destroy.

7. The shellfish detoxification process according to claim 5, wherein the concentration of alkaline buffer is between 5 mM and 2 M.

8. The shellfish detoxification process according to claim 1, wherein the alkaline solution has a pH of at least 6.0.

9. The shellfish detoxification process according to claim 1, wherein said predetermined time of submerging the shellfish in said alkaline solution is up to 2 days.

10. The shellfish detoxification process according to claim 1, wherein the thermal heat treatment step after the imbibition with the alkaline solution comprises one selected from the group consisting of said alkaline boiling in solution, injecting hot water vapor directly into said alkaline solution having the imbibed shellfish, and employing in an autoclave to heat treat.

11. The shellfish detoxification process according to claim 1, wherein the time and the temperature employed for the thermal heat treatment is commensurate with said shellfish and the toxin present, and wherein the time is between about 10 seconds to about 5 hours.

12. The shellfish detoxification process according to claim 1, wherein submergence in said alkaline solution is repeated to reduce the toxin present to a predetermined desired level.

13. The shellfish detoxification process according to claim 1, wherein the shellfish submergence in said alkaline solution reduces the shellfish toxins by destruction and extraction.

14. The shellfish detoxification process according to claim 12, further comprising removing the toxins.

15. The shellfish detoxification process according to claim 13, further comprising destroying said toxins by another stronger alkaline treatment comprising providing an additional alkaline solution at a more concentrated level, and said thermal heat treatment being at higher temperature and for a longer time.

16. The shellfish detoxification process according to claim 1, wherein the shellfish depuration comprises transferring the shellfish to an essentially toxin free environment until toxicity is naturally diminished.

17. The shellfish detoxification process according to claim 1, wherein the removal of the toxic parts of the shellfish consists in eliminating of siphons, rims mantels, rings, borders, digestive glands, hepatopancreas, liver, gills and gonads.

18. The shellfish detoxification process according to claim 17, further comprising an alkaline treatment of the toxic removed parts in order to reduce their toxicity so as to be useful as raw material for other products.

19. The shellfish detoxification process according to claim 1, wherein toxicity of the shellfish to be detoxificated is up to about 40,000 ug STX equivalent/100 g.

20. The shellfish detoxification process according to claim 1, further comprising reducing the pH of the shellfish by immersion treatment with one of an acid or a buffered acid to an acidic pH after the thermal process.

21. The shellfish detoxification process according to claim 1, further comprising reducing the pH of canned shellfish by covering with a liquid comprising one of a buffer and an acid to reduce the pH to a desired organoleptic level.

22. The shellfish detoxification process according to claim 21, wherein the buffers or acids used to reduce the pH is a compound selected from the group consisting of acetic acid, citric acid, ascorbic acid, butyric acid, phosphoric acid, hydrochloric acid, glutamic acid, any aminoacid, phthalic acid, succinic acid, pyruvic acid, glyceric acid, maleic acid, boric acid, acetic/acetate, $H_3PO_4/H_2PO_4^-$, $H_2PO_4^-/HPO_4^{2-}$, tripolyphosphate, and EDTA.

23. The shellfish detoxification process according to claim 22, further comprising a mixture of two or more said buffers or acids to reduce the pH, and whereby either or both the organoleptic level and rheologic properties of said detoxified shellfish are improved.

* * * * *